United States Patent
Petrioli et al.

(10) Patent No.: US 10,659,570 B2
(45) Date of Patent: May 19, 2020

(54) METHOD AND DEVICE FOR DYNAMICAL PROTOCOL SELECTION

(71) Applicant: UNIVERSITA' DEGLI STUDI DI ROMA "LA SAPIENZA", Rome (IT)

(72) Inventors: Chiara Petrioli, Rome (IT); Francesco Lo Presti, Rome (IT); Valerio Di Valerio, Rome (IT); Daniele Spaccini, Rome (IT); Luigi Picari, Sutri (IT)

(73) Assignee: UNIVERSITA' DEGLI STUDI DI ROMA "LA SAPIENZA", Rome (IT)

( * ) Notice: Subject to any disclaimer, the term of this patent is extended or adjusted under 35 U.S.C. 154(b) by 85 days.

(21) Appl. No.: 15/768,275

(22) PCT Filed: Oct. 14, 2016

(86) PCT No.: PCT/IB2016/056164
§ 371 (c)(1),
(2) Date: Apr. 13, 2018

(87) PCT Pub. No.: WO2017/064660
PCT Pub. Date: Apr. 20, 2017

(65) Prior Publication Data
US 2018/0302504 A1   Oct. 18, 2018

(30) Foreign Application Priority Data
Oct. 16, 2015 (IT) .......................... 102015000062624

(51) Int. Cl.
*G06F 15/173*   (2006.01)
*H04L 29/06*   (2006.01)
(Continued)

(52) U.S. Cl.
CPC .............. *H04L 69/18* (2013.01); *H04L 43/04* (2013.01); *H04L 67/12* (2013.01)

(58) Field of Classification Search
CPC .......... H04L 69/18; H04L 43/04; H04L 67/12
(Continued)

(56) References Cited

U.S. PATENT DOCUMENTS 6,788,651 B1 * 9/2004 Brent ...................... H04L 47/10
370/255
6,965,816 B2 * 11/2005 Walker ................... B64C 13/20
701/16

(Continued)

OTHER PUBLICATIONS

Azad, Saiful, et al.; "MACA-APT: A MACA-Based Adaptive Packet Train Transmission Protocol for Underwater Acoustic Networks," in Proceedings of the International Conference on Underwater Networks & Systems, ser. WUWNET '14, New York, NY, ACM, 2014, pp. 18:1-18:5.

(Continued)

*Primary Examiner* — Melvin H Pollack
(74) *Attorney, Agent, or Firm* — Harness, Dickey & Pierce, P.L.C.

(57) ABSTRACT

The method of the invention envisages estimation and learning of the state of the system using the data traffic of the network itself, with co-ordination of a node, selected as collector, which, in addition to its normal data-collection role, determines and changes dynamically the network-protocol stack used, for optimizing the performance of interest, where for this purpose said node, with a processing unit thereof, implements a computer program referred to as "protocol selector", which: executes monitoring of the network state and collection of the data on the performance of the network itself; evaluates at periodic intervals the performance of the protocol in the last interval and executes a step of a reinforcement-learning algorithm at the end of which it evaluates whether to change or not the protocol for the next interval and resumes the main execution flow.

7 Claims, 5 Drawing Sheets

(51) Int. Cl.
*H04L 29/08* (2006.01)
*H04L 12/26* (2006.01)

(58) Field of Classification Search
USPC .......................................................... 709/223
See application file for complete search history.

(56) References Cited

U.S. PATENT DOCUMENTS

| | | | | |
|---|---|---|---|---|
| 7,590,589 | B2* | 9/2009 | Hoffberg | G06Q 20/401 705/37 |
| 7,715,433 | B2* | 5/2010 | Boren | H04L 12/66 370/465 |
| 7,747,710 | B1* | 6/2010 | Osburn, III | G06Q 10/08 709/220 |
| 7,773,741 | B1* | 8/2010 | LeBlanc | G10L 25/90 379/406.01 |
| 7,929,466 | B2* | 4/2011 | Tillotson | H04W 72/10 370/252 |
| 8,139,504 | B2* | 3/2012 | Mankins | H04W 40/26 370/254 |
| 8,874,477 | B2* | 10/2014 | Hoffberg | G06Q 10/0631 705/37 |
| 9,061,102 | B2* | 6/2015 | Levien | G05D 1/0011 |
| 9,253,663 | B2* | 2/2016 | Raleigh | H04W 24/02 |
| 9,294,113 | B2* | 3/2016 | Feizi-Khankandi | H03M 1/1265 |
| 9,479,341 | B2* | 10/2016 | Bugenhagen | H04L 12/14 |
| 9,537,759 | B2* | 1/2017 | Calmon | H04B 7/15521 |
| 9,749,150 | B2* | 8/2017 | McLeod | H04L 43/022 |
| 9,923,826 | B2* | 3/2018 | Murgia | H04L 47/125 |
| 10,095,878 | B2* | 10/2018 | Goldfarb | H04L 41/12 |
| 10,311,243 | B2* | 6/2019 | Calmon | G06F 21/6209 |
| 10,404,556 | B2* | 9/2019 | Reynolds | H04L 41/145 |
| 10,440,161 | B2* | 10/2019 | Solis | |
| 2004/0017829 | A1 | 1/2004 | Gray et al. | |
| 2008/0013569 | A1 | 1/2008 | Boren | |
| 2011/0284218 | A1* | 11/2011 | Chudnovsky | E21B 43/003 166/250.15 |
| 2015/0295892 | A1 | 10/2015 | Kafle | |
| 2015/0295982 | A1 | 10/2015 | Kafle et al. | |
| 2016/0380860 | A1* | 12/2016 | Singhal | H04L 43/0864 709/224 |
| 2017/0085437 | A1* | 3/2017 | Condeixa | H04L 43/06 |

OTHER PUBLICATIONS

Casolari, Sara, et al.; "An Adaptive Model for Online Detection of Relevant State Changes in Internet-Based Systems," Performance Evaluation, vol. 69, No. 5, May 2012, pp. 206-226.

Chirdchoo, Nitthita, et al.; "Aloha-Based MAC Protocols With Collision Avoidance for Underwater Acoustic Networks," in Proceedings of the 26th IEEE International Conference on Computer Communications (IEEE INFOCOM 2007), Anchorage, Alaska, May 6-12, 2007, pp. 2271-2275.

Chirdchoo, Nitthita, et al.; "RIPT: A Receiver-Initiated Reservation-Based Protocol for Underwater Acoustic Networks," IEEE Journal on Selected Areas in Communications (JSAC), Special Issue on Underwater Wireless Communications and Networks, vol. 26, No. 9, Dec. 2008, pp. 1744-1753.

Guerra, Federico, et al.; "World Ocean Simulation System (WOSS): A Simulation Tool for Underwater Networks With Realistic Propagation Modeling," in Proceedings of ACM WUWNet 2009, Berkeley, California, Nov. 3, 2009, pp. 1-8.

Guo, Xiaoxing, et al.; "An Adaptive Propagation-Delay-Tolerant MAC Protocol for Underwater Acoustic Sensor Networks," IEEE Journal of Oceanic Engineering, vol. 34, No. 2, Apr. 2009, pp. 170-180.

Han, Seongwon, et al.; "M-FAMA: A Multi-Session MAC Protocol for Reliable Underwater Acoustic Streams," in Proceedings of the 32nd IEEE International Conference on Computer Communications (IEEE INFOCOM 2013), Apr. 14-19, 2013, pp. 655-673.

Kephart, Jeffrey O., et al; "The Vison of Autonomic Computing," IEEE Computer, vol. 36, No. 1, Jan. 2003, pp. 41-50.

Molins, Marçal, et al.; "Slotted FAMA: A MAC Protocol for Underwater Acoustic Networks," in Proceedings of MTS/IEEE Oceans 2006, Singapore, 2006, pp. 1-7.

Ng, Hai-Heng, et al.; A Bidirectional-Concurrent MAC Protocol With Packet Bursting for Underwater Acoustic Networks, IEEE Journal of Oceanic Engineering, vol. 38, No. 3, Jul. 2013, pp. 547-565.

Ng, Hai-Heng, et al.; "MACA-U: A Media Access Protocol for Underwater Acoustic Networks," in Proceedings of the Global Telecommunications Conference (IEEE GLOBECOM 2008), Nov. 2008, pp. 1-5.

Nguyen, Trong Hung, et al.; "Adaptive Energy Reservation MAC Protocol for Underwater Acoustic Sensor Networks," 2008 IEEE/IFIP International Conference on Embedded and Ubiquitous Computing, EUC '08, vol. 2, Dec. 2008, pp. 670-675.

Noh, Youngtae, et al.; "DOTS: A Propagation Delay-Aware Opportunistic Mac Protocol for Mobile Underwater Networks," IEEE Transactions on Mobile Computing, vol. 13, No. 4, Apr. 2014, pp. 766-782.

Peleato, Borja, et al.; "Distance Aware Collision Avoidance Protocol for Ad-Hoc Underwater Acoustic Sensor Networks," IEEE Communications Letters, vol. 11, No. 12, Dec. 2007, pp. 1025-1027.

Pescosolido, Loreto, et al.; "A Multi-Band Noise-Aware MAC Protocol for Underwater Acoustic Sensor Networks," 2013 IEEE 9th International Conference on Wireless and Mobile Computing, Networking and Communications (WiMob), Lyon, France, Oct. 7-9, 2013, pp. 513-520.

Petrioli, Chiara, et al.; "A Comparative Performance Evaluation of MAC Protocols for Underwater Sensor Networks," in Proceedings of MTS/IEEE Oceans 2008, Quebec City, Quebec, Canada, Sep. 15-18, 2008, pp. 1-10.

Syed, Affan A., et al.; "Comparison and Evaluation of the T-Lohi MAC for Underwater Acoustic Sensor Networks," IEEE Journal on Selected Areas in Communications, vol. 26, No. 9, Dec. 2008, pp. 1731-1743.

Syed, Affan, et al.; "Understanding Spatio-Temporal Uncertainty in Medium Access With ALOHA Protocols," in Proceedings of ACM WUWNet 2007, Montreal, Quebec, Canada, Sep. 14, 2007, pp. 41-48.

Zhu, Ming, et al.; "UPMAC: A Localized Load-Adaptive MAC Protocol for Underwater Acoustic Networks," IEEE Sensors Journal, vol. 16, No. 11, Jun. 1, 2016, pp. 4110-4118.

International Search Report and Written Opinion of the International Searching Authority issued in PCT/IB2016/056164, dated Feb. 23, 2017; ISA/EPO.

International Search Report/Written Opinion dated Feb. 23, 2017.

* cited by examiner

METHOD AND DEVICE FOR DYNAMICAL PROTOCOL SELECTION

FIELD OF THE INVENTION

The present invention relates to the sector of communications in the underwater environment and more in particular to a method and a device that enables an underwater sensor network, equipped with one or more communication apparatuses that operate with different protocol stacks (by "protocol stack" is meant the layer structure typical of any protocol) to provide consistent levels of performance as the operating conditions in which the network may operate vary. This is obtained by providing a method and a device that implements said method for selecting dynamically, and autonomously in time, the best solution to be used for communication between the various nodes of the network in order to adapt autonomously to the ever different and changeable conditions of the underwater environment.

PRIOR ART

The use of UWSNs (Underwater Wireless Sensor Networks) makes possible a wide range of applications such as, among other things, environmental monitoring, monitoring of critical infrastructures and of offshore platforms, surveillance of ports and coasts, etc. An underwater sensor network is made up of a set of nodes, appropriately positioned to cover the area of interest and located at various depths, some of which may be mobile autonomous vehicles. Each node is equipped with sensors and one or more communication apparatuses. The nodes collect from the surrounding environment data, which, after a local processing, are sent to one or more collector nodes that store/handle/transport the data elsewhere on the basis of the type of application. The exchange of data may also regard sending of commands or information on the state of the devices.

Creation of a communication network between nodes requires the solution of the various problems that characterize communication in underwater environment. In the first place, given the limits imposed by the underwater environment on the use of electromagnetic waves (which are markedly attenuated in water), the communication has up to the present day typically been obtained via acoustic waves, which implies marked propagation delays (of the order of seconds) and a limited transmission band (a few kilobits per second). Furthermore, as amply demonstrated by the multiple experimental campaigns, there is present a considerable heterogeneity, variability of the quality, and asymmetry of the communication channels between the nodes, with transmission characteristics markedly depending upon various conditions such as depth, temperature, salinity, profile of the seabed, condition of the surface wind, noise produced, for example, by passing watercraft, etc., conditions that are moreover subject to variations that are frequently unforeseeable over time, even over short periods.

Up to the present day, various protocol solutions (layer 1 or physical layer, layer 2 or link layer, and layer 3 or network layer) have been proposed in the literature in order to optimize the performance of an underwater sensor network, these solutions, to different extents, amounting to:

performance indices linked to network latency (time required for a packet to reach the collector node);

performance indices linked to the success of transmission (probability of a packet reaching the collector node); and performance indices linked to energy consumption (energy consumed by the network per data unit that reaches the collector node).

The various solutions differ as regards the routing policy adopted (routing of layer 3 of the stack), use of a policy for guaranteeing reliability (reliable communication at layer 2 of the stack), as likewise the policy of access to the medium (Medium-Access Control—MAC—protocol of layer 2 of the stack), and the choice of transmission, modulation, and encoding frequency and possibly power level used in transmission (layer 1) [PPe13, AzCa14, NgSh08, TaWe10, SyYe07, PeSt07, ChSo07, NgSo13, NgSo08, ZhQi14, ChSo08, GuFr09, PPe08, SyYe07, MoSt06, Hallo13, NoLe14].

However, as also shown by the various experimental campaigns conducted in the recent past, there are currently no solutions capable of providing consistent levels of performance as the working conditions in which the network may be operating vary. Network solutions that yield good performance in certain scenarios yield poor performance in others. For this reason, some commercial modems support a number of protocol stacks, and there are emerging devices equipped with a number of communication apparatuses (for example, a number of modems produced by different firms operating on the same transmission bands or on different transmission bands).

Finally, it should be noted how in the recent past patent applications have been filed that contemplate simultaneous use of a number of protocol stacks [US3569, US7710, US7829, US5982]. As compared to the patent application presented in [US3569], for example, the present invention proposes an altogether original detailed procedure for dynamic and autonomous configuration of the protocol stack according to the specific operating scenario, an aspect that is not specified in the above patent application. Similar considerations apply also as regards the patent application [US7710], which, instead, proposes a solution for monitoring a heterogeneous set of devices. Both of the previous considerations differentiate the present invention also from the patent application disclosed in [US7829]. Finally, the patent application [US5982] proposes a method for dynamically switching between two protocols, e.g. TCP and UDP, according to the type of applicational traffic generated by the user.

The task of the present invention is to provide a procedure, and the means for implementing it, that will enable a deployed system equipped with communication devices that operate with different protocol stacks (and that in particular use different solutions at layers 1 and 2 of said stacks) to select dynamically and autonomously in time the best configuration (namely, the best solution to use for the communication), i.e., the configuration that best meets the user specifications, it being able to adapt autonomously and dynamically and in an effective way to the ever different and changeable conditions of the underwater environment.

Optimization of the system is effected so as to meet in the best possible way criteria of importance of the various performance metrics specified, for the given state in which the system is operating, beforehand or periodically by the user.

The solution proposed is based upon the capacity of estimating and learning the network state. The inventive idea is to entrust the network itself, under the co-ordination by the collector node, with the task of determining/changing dynamically the stack of network protocols used at layer 2 (and possibly at layer 1) in order to optimize the performance of interest. For this purpose, said node is provided with processing capacity and with batteries and is connected via standard connectors to a number of modems, some of which are provided with a number of protocol stacks.

The description of the invention will be better understood with reference to the attached plates of drawings, which illustrate, merely by way of non-limiting example, a preferred embodiment thereof.

In the plates of drawings:

FIG. 1 is a schematic representation of the implementation of the invention and shows a photograph of the HW/SW implementation of the invention by the present inventors.

It comprises at least one cylindrical container arranged inside which is the battery pack and the software component for the choice of the protocol stacks.

The device, provided with processing capacity and with batteries, is interconnected via standard connectors to one or more modems, some of which can be equipped with a number of protocol stacks. Dynamically, via interaction with the modem, analysis of the data collected, and estimation of the state of the network and of the channel, the device selects and uses the best modem and the best protocol stack for communication. Commercial modems available frequently use proprietary solutions at layers 1 and 2 of the protocol stack. Hence, an important characteristic of the solution developed is that it is possible to take decisions even without having under control or without knowing the algorithmic logic of the solution adopted in the commercial device, also choosing the best commercial device to activate for communication at a given moment.

Even though adaptive solutions have been proposed in the prior art above all regarding routing of the packets, which are able to vary their behaviour as some parameters vary, there does not so far exist a solution that enables the sensor network to choose dynamically and automatically from among various protocol stacks the best one to activate in order to meet the user requirements, even without knowing the operating logic of the protocols of the stack.

This capacity is what is needed if the aim is to develop solutions that enable optimization of real systems obtained with commercial communication devices, possibly multi-vendor ones.

DETAILED DESCRIPTION OF THE INVENTION

The invention consists in a method—also referred to as "protocol selector"—and the means for its implementation, which makes it possible, in an underwater sensor network, to make measurements, and determine autonomously the network-protocol stack and change said stack dynamically, in order to optimize the performance of the application supported (in terms of network latency, packet-delivery fraction, energy consumption, etc., and/or a combination thereof).

It is assumed that each network node is provided with a number of network-protocol stacks $p_1, p_2, \ldots, p_n$. Each protocol may correspond to a different hardware apparatus or more simply to a different configuration of one and the same apparatus.

The invention consists in a new component referred to as "protocol selector", which measures, evaluates, and co-ordinates timed activation and change of execution of the protocol stack $p_i$, being executed in the sensor network, with particular reference to the first two layers of the protocol stack, i.e., to the protocols being executed at the link layer.

Figure 1:
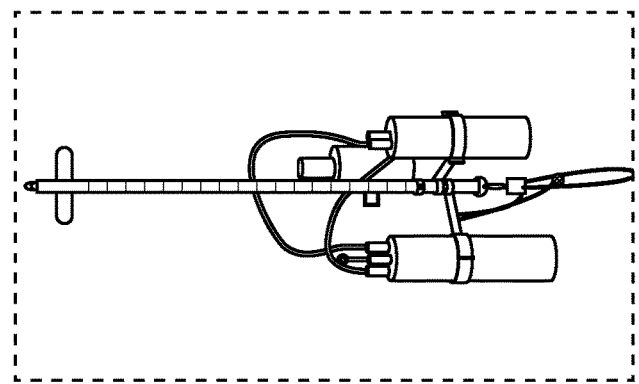
FIG. 1 shows a modular sensor node according to the invention in an embodiment thereof provided by way of example.
Figure 2:
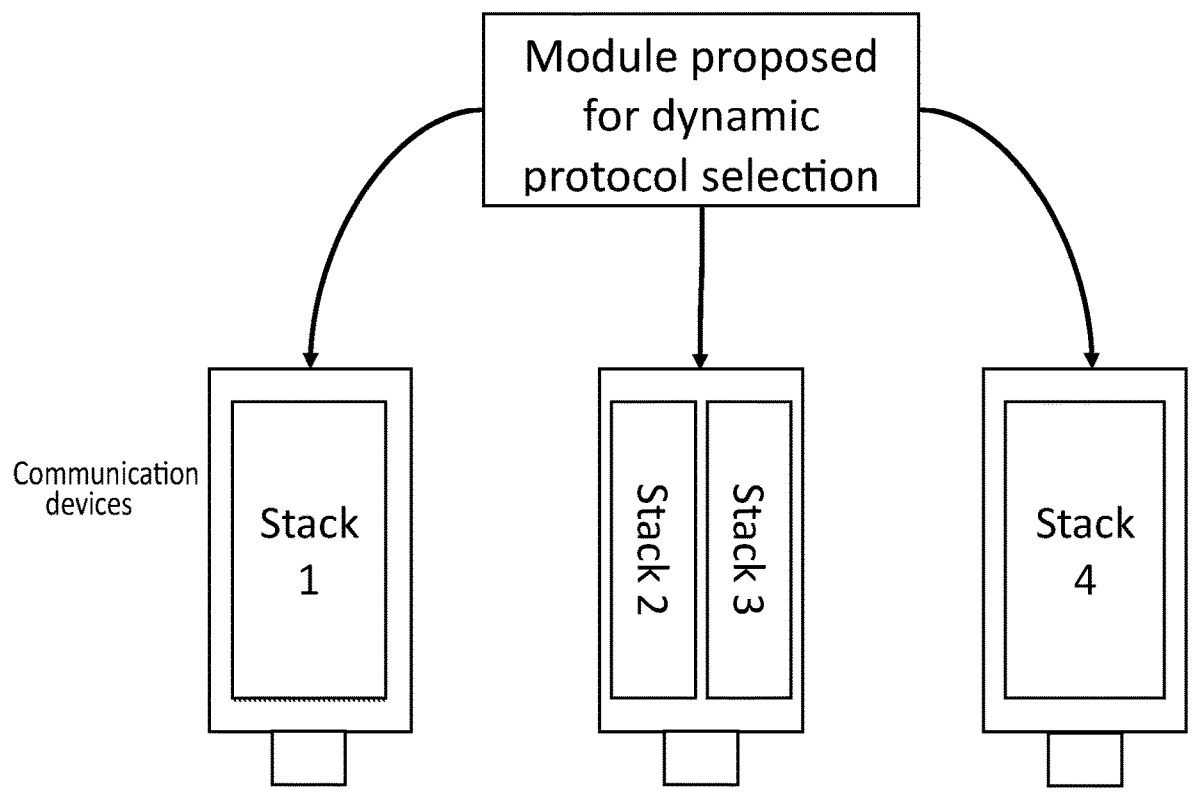
FIG. 2 shows a scheme provided by way of example of the system with the module connected to a number of communication devices by means of standard connectors.
Figure 3:
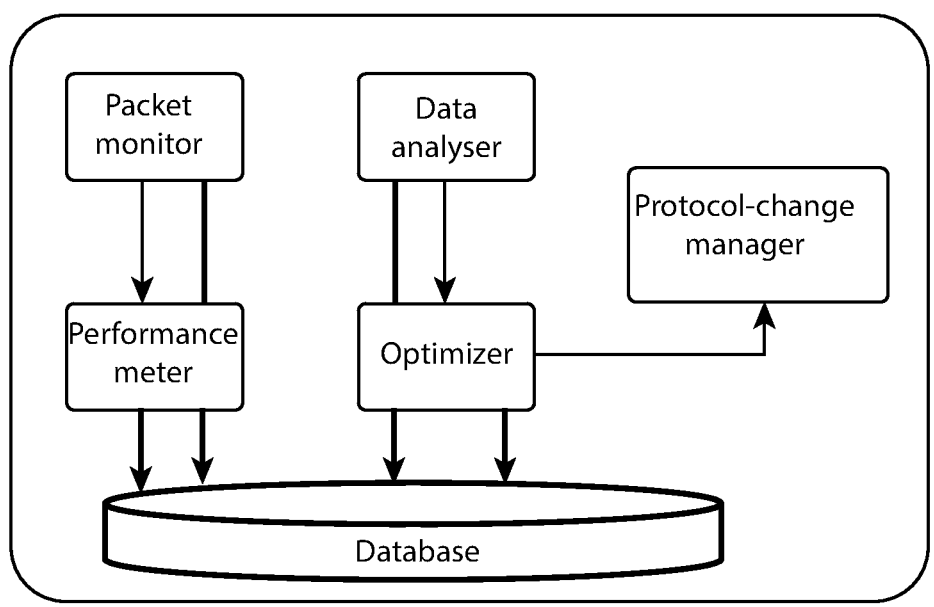
FIG. 3 represents the modules of the protocol selector.

Consider the modules of the protocol selector shown in FIG. 2.

According to the invention, said software component is made up of the following modules:

Packet monitor (module A), which is designed to analyse the packets received by the collector for extracting all the information necessary for: (i) evaluating the performance of the current protocol; and (ii) identifying possible changes in the system (steps 2 and 5 of the flowchart);

Data analyser (module B), which is designed to analyse the data collected for identifying possible changes in the system, said changes possibly regarding a different traffic in the network, a variation in the quality of the acoustic channel, or else a change in the size of the packets exchanged by the nodes (steps 3, 4, and 9 of the flowchart);

Performance meter (module C), which is responsible for calculating the performance of the protocol currently in use (step 6 of the flowchart);

Optimizer (module D), which is the core of the protocol selector and the task of which is to execute the learning algorithm [SuBa98] in order to learn which is the optimal protocol stack for each state of the system, using for this purpose the results produced by the performance meter A (steps 7, 8, and 10 of the flowchart); and Protocol-change manager (module E), which is responsible for managing protocol change in the network, without interrupting operation thereof (step 11 of the flowchart).

The execution flow normally follows a MAPE (Monitor-Analyse-Plan-Execute) cycle [KeCh03] (part delimited by the solid line in FIG. 4): the protocol selector carries out monitoring of the network state and collects the data on network performance (step 2); at periodic intervals the performance of the protocol in the last interval is evaluated (step 6) and a step of the reinforcement-learning algorithm is carried out (step 7) [SuBa98], at the end of which it is evaluated whether to change or not the protocol for the next interval (step 8), and then a new monitoring cycle starts.

Figure 4:
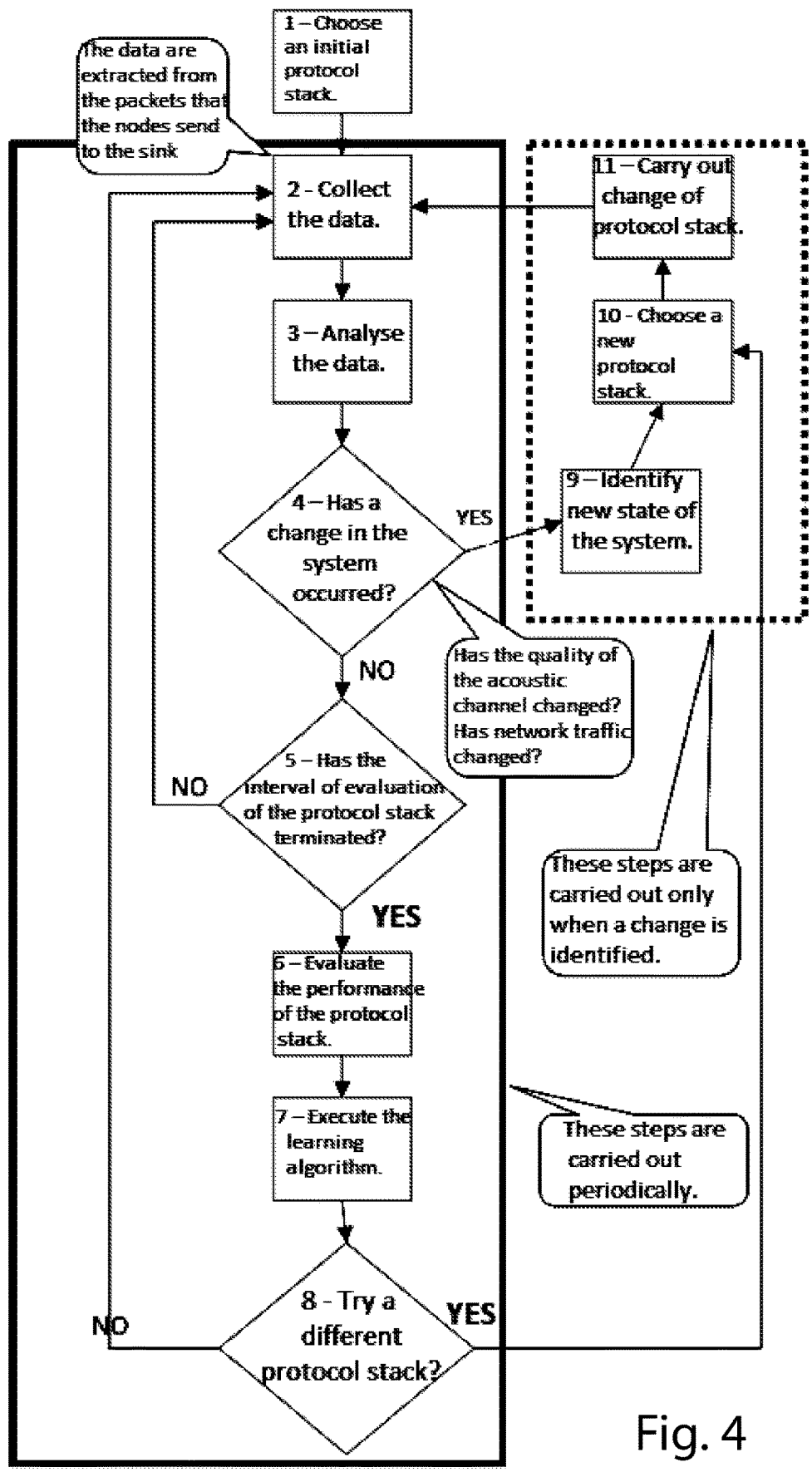
FIG. 4 shows the execution flow of the protocol-selector component.

The execution flow is interrupted if a change of state is detected in the system (step 4). In this case, the steps delimited by the dashed line in FIG. 4 are carried out: the new state (step 9) and the protocol stack that is most adequate for the new state are identified and change of protocol stack (step 10) is carried out; the main execution flow is then resumed.

Details of the Execution Flow

Step 2.

The protocol selector, which is the software component forming the subject of the invention, characterizes the operating state of the system by a triplet of values that summarizes the condition of the network at a given instant and that is defined as network state: mean signal-to-noise ratio $q_{snr}$, network load $☐$, and mean packet size $p_{size}$. If we denote by s the network state, we can write $s=(☐, q_{snr}, p_{size})$. In order to carry out monitoring of the network state, the headers of the network packets are extended so as to include the necessary information. In particular, to each transmitted packet k, the node j adds the header field HDPRE where $\langle p_k^j, t_{tx}^j, t_k^i \rangle$, where $p_k^j$ is a progressive identifier of the packets sent by the node k, $t_{tx}^j$ is the total time of transmission of the node j in the current round, and $t_k^j$ is the timestamp of the packet.

Steps 3-4-5.

The data-analysis module is responsible for detection of changes, even significant, in the network state. For this purpose, for each of the three components of the state (mean signal-to-noise ratio, network load, mean packet size) there is adopted a change-detection algorithm of an adaptive type belonging to the CUSUM family [Mo08, CaTo12] combined with a low-pass filter (exponentially weighted moving average, EWMA) for monitoring the average of the values.

Steps 9-10-11.

If the system does not detect changes in the state, it proceeds with collection of the data up to the possible completion of the current evaluation interval. If, instead, the state has changed, data collection is interrupted, the new state is detected, and the best protocol stack for the new conditions is chosen (the details are shown hereinafter). Once change of state is completed, a new interval of collection of statistics regarding the new state is started.

Step 6.

At the end of an i-th evaluation interval the performance features of the protocol are first analysed in terms of packet-delivery fraction $r_i$, energy consumption $e_i$, and network latency $l_i$ in the interval just concluded. These values are calculated starting from the information contained in the field HDPRE of the packets, as follows:

$$r_i = \frac{\sum_j p_{rcv}^j}{\sum_j p_{snt}^j}$$

$$l_i = \frac{\sum_j \sum_k t_k^j}{\sum_j p_{rcv}^j}$$

$$e_i = \frac{\sum_j t_{tx}^j}{8L \cdot \sum_j p_{rcv}^j}$$

where $p_{snt}^j$ is the number of packets sent by the node j during the evaluation interval just concluded (which can be calculated starting from the header HDPRE as $p_{snt}^j = \max_k p_k^j - \min_k p_k^j + 1$), $p_{rev}^j$ is the number of packets received by the node j in the same interval, $l_k^j$ is the latency of the packet k, which is obtained from the difference between the instant of receipt and the timestamp $t_k^j$ of the packet, and L is the mean length of a packet in bytes.

Starting from the indices $r_i$, $l_i$, and $e_i$, a single aggregate scalar index $c_i$ is then calculated, which takes into account the various performance indices, appropriately normalized and weighted according to the requirements of the application:

$$c_i = w_r \cdot \tilde{r}_i + w_e \cdot \tilde{e}_i + w_l \tilde{l}_i$$

where $\tilde{r}_i$, $\tilde{e}_i$, and $\tilde{l}_i$ are the values normalized in the interval [0,1] of the packet-delivery fraction, of the energy per bit, and of the network latency, which are calculated according to the following respective formulas:

$$\tilde{r}_i = \begin{cases} \frac{r_i - \min r_m}{\max r_m - \min r_m} & \max r_m \neq \min r_m \\ 1 & \max r_m = \min r_m \end{cases}$$

$$\tilde{e}_i = \begin{cases} \frac{\max e_m - e_i}{\max e_m - \min e_m} & \max e_m \neq \min e_m \\ 1 & \max e_m = \min e_m \end{cases}$$

and $$\tilde{l}_i = \begin{cases} \frac{\max l_m - l_i}{\max l_m - \min l_m} & \max l_m \neq \min l_m \\ 1 & \max l_m = \min l_m \end{cases}$$

where the minimum and maximum values are precalculated via simulations, estimated, or based upon experience and where the non-negative weights, $w_r$, $w_e$ and $w_l$, $w_r + w_e + w_l = 1$, yield the weights of the features and depend upon the application. For example, if the aim is only to minimize the network latency, it is sufficient to use $w_l = 1$, setting the other weights to zero. If reliability of the communication and energy consumption have the same weight, whereas the latency is not important, it is possible to set $w_r = w_e = 0.5$, and $w_l = 0$.

Step 7.

Learning step: the performance statistics of the protocol $p_i$ for the current state of the system $s = (☐, q_{snr}, p_{size})$ used in the last interval are updated by re-calculating the mean value taking into account the aggregate index $c_i$ just calculated $$c(s, p_i) = \frac{\sum_{m=1}^{i} c_m 1_{\{p_m = p_i, s_m = s\}}}{\sum_{m=1}^{i} 1_{\{p_m = p_i, s_m = s\}}}$$

Steps 8-10.

Next, it is evaluated which protocol stack to use in the next interval, interval i+1, with the system in the state s, where the solution proposed is based upon a general mathematical ε-greedy reinforcement-learning technique known as n-armed bandit [SuBa98] so that the choice falls on the protocol stack that has guaranteed the best level of performance for the current state (behaviour known as "exploitation"—i.e., exploitation of acquired knowledge—in the reinforcement-learning literature); however, with a small probability ε, e.g., ε=0.01 or ε=0.05, the stack is selected randomly (behaviour known as "exploration"). The latter choice, among other things, enables the protocol selector to adapt in the case of non-stationary behaviour of the surrounding environment, providing the system with the capacity of adapting dynamically. The pseudocode is shown below.

\# the variable proto indicates the protocol stack to be used
rnd=a random value between 0 and 1;
if rnd≤ε
   proto=protocol stack chosen randomly
else
   proto=arg max$_{k=1,\ldots,n}\overline{c(s,p_k)}$ Experimental Results To highlight the advantages of the invention, illustrated hereinafter are experimental results obtained via simulation. In the experiments there was simulated operation of an environmental-monitoring network with single-hop configuration (i.e., where all the nodes can communicate directly with the collector node) with 7 nodes (6 nodes plus the collector) randomly positioned in a region having a uses handshake for booking the channel obtained via a small control packet (referred to as "tone"); and the DACAP protocol [PeSt07], which uses a handshake based upon the use of RTS/CTS control packets for booking the channel, to which there are added further control packets. The aim is to show the ability of the protocol selector in adapting dynamically the configuration of the link layer using each time the best MAC protocol for each condition of the network.

The performance of the protocols in delivering data to the collector node were evaluated using the following performance metrics:

packet delivery ratio (PDR), namely the ratio of packets delivered to the collector node, defined as the fraction between the packets correctly received by the collector node and all the packets generated by the nodes;

end-to-end latency, defined as the time that elapses between generation of the packet and its correct reception at the collector node;

energy per bit, defined as the energy consumed in the network for delivery of a data bit to the collector node.

Experimental Results—Behaviour of the Individual Protocols

Initially, the performance of the protocols CSMA, T-Lohi, and DACAP was evaluated in different network configurations. The results obtained are shown in Table 1, for different values of network traffic, $\lambda_1=0.033$ and $\lambda_2=0.05$, and packet size, 128 B and 2000 B.

TABLE 1

Simulation results obtained with the individual protocols

| | Metric | | | | | | | | | | | |
|---|---|---|---|---|---|---|---|---|---|---|---|---|
| | 128 Bytes | | | | | | 2000 Bytes | | | | | |
| | $\lambda_1 = 0.033$ | | | $\lambda_2 = 0.05$ | | | $\lambda_1 = 0.033$ | | | $\lambda_2 = 0.05$ | | |
| | CSMA | T-Lohi | DACAP | CSMA | T-Lohi | DACAP | CSMA | T-Lohi | DACAP | CSMA | T-Lohi | DACAP |
| Packet delivery ratio | 0.97 | 0.99 | 0.99 | 1 | 1 | 1 | 0.89 | 0.94 | 0.98 | 1 | 1 | 0.9 |
| End-to-end latency (sec.) | 1.9 | 4.5 | 6.5 | 1.9 | 3.9 | 5.5 | 29.1 | 36.1 | 42.9 | 16.8 | 18.9 | 112.9 |
| Energy per bit (J/b · $10^{-3}$) | 3.43 | 3.5 | 3.79 | 3.35 | 3.48 | 3.76 | 3.53 | 3.31 | 3.39 | 3.30 | 3.31 | 3.60 | surface of 2 km$^2$ and at different depths, from 10 to 50 m corresponding to the environment off the coasts of the island of Palmaria (La Spezia, Italy). All the information necessary for simulation was obtained from the World Ocean Database (http://www.nodc.noaa.gov/OC5/WOAO5/pr woa05.html), the General Bathymetric Chart of the Oceans (GEBCO) (http://www.gebco.net), and the National Geophysical Data Center Deck41 database (http://www.ngdc.noaa.gov/mgg/geology/deck41.html).

In the network, the nodes transmit periodically to the collector node the values monitored at a rate of $\lambda_1=0.033$ packets per second. Whenever an event arises, such as overstepping of a predetermined threshold value by one of the parameters under observation, the nodes start to transmit constantly data at a fixed rate $\lambda_2=0.05$ packets per second. When the value returns below the critical threshold, the nodes transmit again at the rate $\lambda_1$. Also the size of the packet can change, irrespective of the traffic, and this within the range [128, 2000] bytes.

In the experiments, it is assumed that each node is provided with three different protocol stacks that differ as regards the MAC protocol of the link layer. In particular, the following protocols are considered: the well known CSMA protocol [TaWe10]; the T-Lohi protocol [SyYe08], which As may be noted, no single protocol proves superior to the others in all the configurations; in fact, as the performance metric considered, the network traffic, and the packet size vary the best performance is guaranteed by different protocols. For example, when the load considered is $\lambda_1=0.033$ and the size of the packet is 128B, CSMA guarantees low values of latency and energy consumption, but at the expense of low values of PDR; at the same time, T-Lohi and DACAP guarantee a higher PDR but at the expense of a greater latency and a higher energy consumption. As the traffic increases ($\lambda_2=0.05$) all the protocols have the same PDR, amounting to 100%, but it is always CSMA that guarantee the best performance in terms of latency and energy consumption.

The behaviour of the various protocols changes significantly if, instead, a packet size of 2000 B is considered, which entails longer transmission times and hence a higher likelihood of collision. DACAP in these conditions has the best PDR, thanks to the use of RTS/CTS control packets that enable booking of the communication channel prior to transmission of the data proper, but at the cost of a greater latency and a greater energy consumption. T-Lohi is characterized by a good compromise between energy consumption and PDR. CSMA still guarantees the minimum delay but with a lower PDR as compared to the other two protocols. When the traffic increases to $\lambda_2=0.05$ the performance of DACAP decays as compared to the other two protocols, which, instead, guarantee low latencies and a PDR of 100%.

Experimental Results—Behaviour of the Protocol Selector

We shall now illustrate the results obtained with the protocol selector in order to show its capacity to adapt autonomously to the variable conditions of the environment. In the experiments that follow, a variation of the environment after 50000 s was simulated, and the behaviour of the protocol selector was observed.

Figure 5:
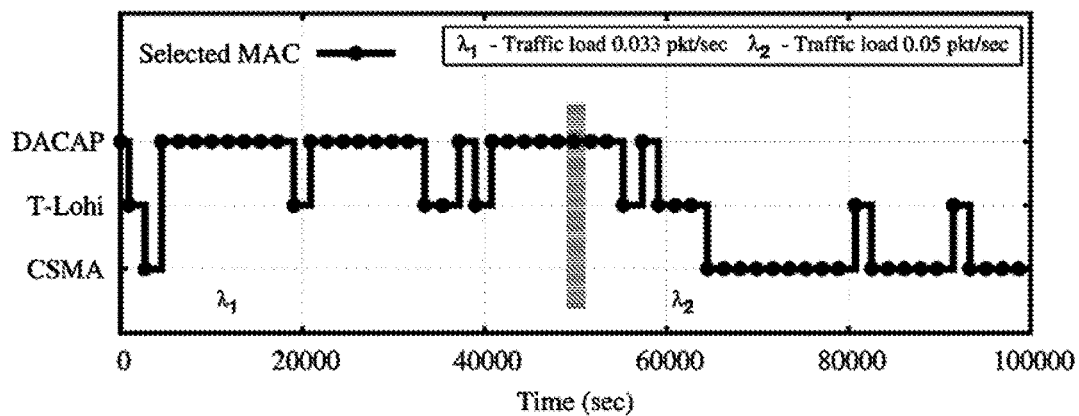
FIG. 5 shows the protocols selected by the protocol selector in time (the vertical bar represents the instant at which the level of network load changes) in the case of optimization of the PDR parameter, PDR standing for Packet Delivery Ratio, which is the ratio between the number of data packets that have been received and the number of data packets sent.
Figure 6:
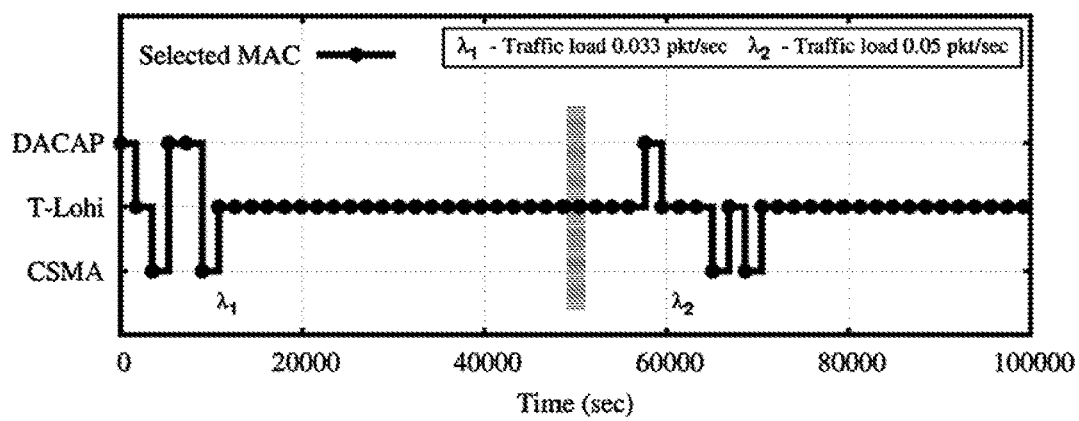
FIG. 6 shows the protocols selected by the protocol selector in time (the vertical bar represents the instant at which the level of network load changes) in the case of optimization of the energy per bit.
Figure 7:
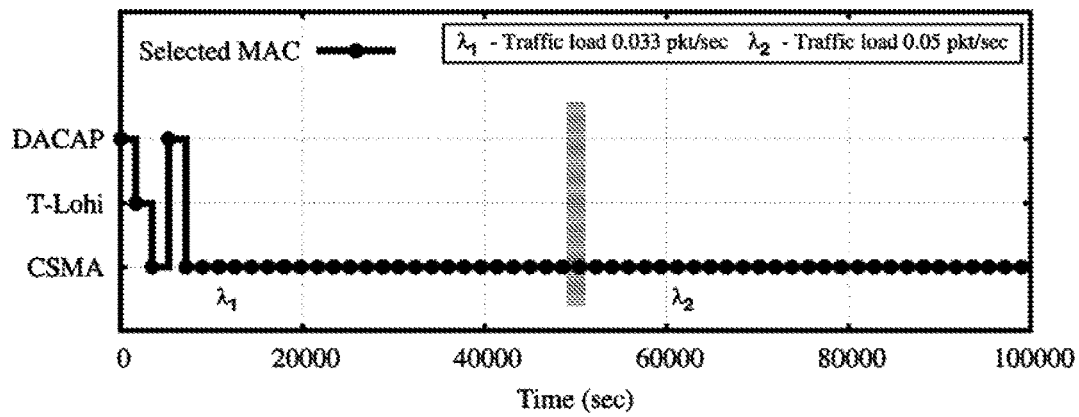
FIG. 7 shows the protocols selected by the protocol selector in time (the vertical bar represents the instant at which the level of network load changes) in the case of optimization of latency.

In the first scenario considered, the traffic was varied from $\lambda_1=0.033$ to $\lambda_2=0.05$ packets per second, keeping the size of the packet constant at 2000 B. Three different experiments were made, optimizing each time a different performance metric, PDR, latency, and energy consumption. The results are shown in FIGS. 5, 6, and 7, which in the specific case show the protocols each time selected by the protocol selector (the vertical bar shows the instant at which the traffic level changes). As may be noted, the protocol selector is always able to identify the best protocol and adapt its behaviour when the traffic changes. The figures illustrate also operation of the learning algorithm: at start of each experiment (or after a vertical bar) the protocol selector is in the exploration step [SuBa98], where it evaluates the behaviour of the various protocols in the current operating conditions. Next, exploiting the knowledge acquired, it goes into the exploitation step [SuBa98] and uses the protocol that has shown the best performance. Occasionally, the protocol selector selects also sub-optimal protocols so as to improve and update its knowledge on the performance of the various protocols.

Figure 8:
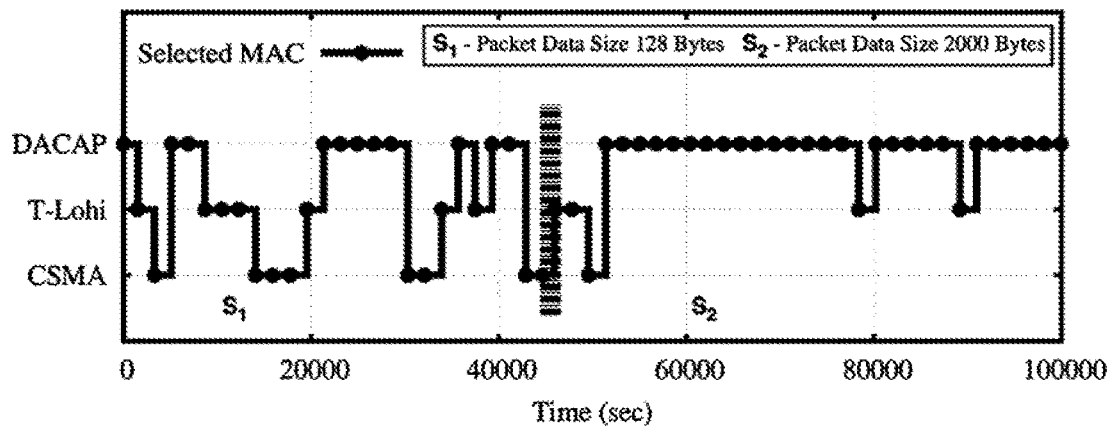
FIG. 8 shows the protocols selected by the protocol selector in time (the vertical bar represents the instant at which the size of the packets changes) in the case of optimization of the PDR parameter.
Figure 9:
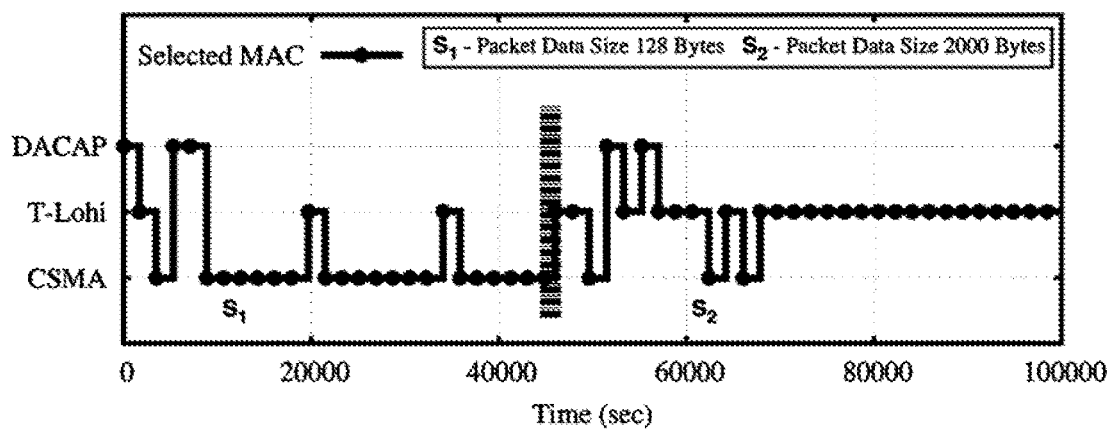
FIG. 9 shows the protocols selected by the protocol selector in time (the vertical bar represents the instant at which the size of the packets changes) in the case of optimization of the energy per bit.
Figure 10:
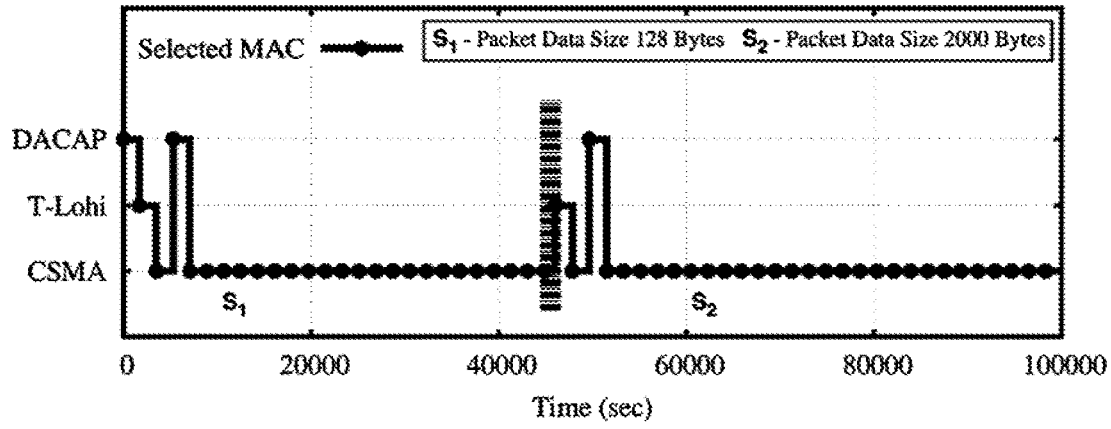
FIG. 10 shows the protocols selected by the protocol selector in time (the vertical bar represents the instant at which the size of the packets changes) in the case of optimization of latency.

In the second scenario considered, the packet size was changed from 128 B to 2000 B, keeping the traffic constant at $\lambda_1=0.033$ packets per second. Again, the experiments were repeated three times varying the metric to be optimized. The results obtained are shown in FIGS. 8, 9, and 10 (the vertical bar shows the instant at which the packet size changes). It should be noted that in all the experiments the protocol selector is always able to identify the optimal protocol.

REFERENCES

[AzCa14] S. Azad, P. Casari, K. T. Hasan, and M. Zorzi, "MACA-APT: A MACAbased Adaptive Packet Train Transmission Protocol for Underwater Acoustic Networks," in *Proceedings of the International Conference on Underwater Networks & Systems*, ser. WUWNET '14. New York, N.Y., USA: ACM, 2014, pp. 18:1-18:5.

[CaTo12] S. Casolari, S. Tosi, and F. Lo Presti, "An adaptive model for online detection of relevant state changes in internet-based systems," *Perform Eval*, vol. 69, no. 5, pp. 206-226, May 2012.

[ChSo07] N. Chirdchoo, W.-S. Soh, and K. C. Chua, "ALOHA-based MAC protocols with collision avoidance for underwater acoustic networks," in *Proceedings of the 26th IEEE International Conference on Computer Communications (IEEE INFOCOM 2007)*, Anchorage, Ak., USA, May 6-12, 2007, pp. 2271-2275.

[ChSo08] N. Chirdchoo, W.-S. Soh, and K.-C. Chua, "RIPT: A receiver-initiated reservation-based protocol for underwater acoustic networks," *IEEE Journal on Selected Areas in Communications (JSAC), Special Issue on Underwater Wireless Communications and Networks*, vol. 26, no. 9, pp. 1744-1753, December 2008.

[GuCa09] F. Guerra, P. Casari, and M. Zorzi, "World ocean simulation system (WOSS): A simulation tool for underwater networks with realistic prop-agation modeling," in *Proceedings of ACM WUWNet 2009*, Berkeley, Calif., 3 Nov. 2009, pp. 1-8.

[GuFr09] X. Guo, M. Frater, and M. Ryan, "An adaptive propagation-delaytolerant MAC protocol for underwater acoustic sensor networks," *IEEE Journal of Oceanic Engineering*, vol. 34, no. 2, pp. 170-180, April 2009.

[GuFr09] X. Guo, M. Frater, and M. Ryan, "An adaptive propagation-delaytolerant MAC protocol for underwater acoustic sensor networks," *IEEE Journal of Oceanic Engineering*, vol. 34, no. 2, pp. 170-180, April 2009.

[Hallo13] S. Han, Y. Noh, U. Lee, and M. Gerla, "M-FAMA: A Multi-session MAC Protocol for Reliable Underwater Acoustic Streams," in *Proceedings of the 32 th IEEE International Conference on Computer Communications (IEEE INFOCOM 2013)*, Apr. 14-19, 2013, pp. 655-673.

[KeCh03] J. O. Kephart and D. M. Chess, "The vision of autonomic computing," *IEEE Computer*, vol. 36, no. 1, pp. 41-50, 2003.

[Mo08] D. Montgomery, *Introduction to Statistical Quality Control*. Wiley, 2008.

[MoSt06] M. Molins and M. Stojanovic, "Slotted FAMA: A MAC protocol for underwater acoustic networks," in *Proceedings of MTS/IEEE OCEANS 2006*, Singapore, 2006, pp. 1-7.

[NgSh08] T. H. Nguyen, S.-Y. Shin, and S.-H. Park, "Adaptive Energy Reservation MAC Protocol for Underwater Acoustic Sensor Networks," in *Embedded and Ubiquitous Computing, 2008. EUC '08. IEEE/IFIP In Conference on*, vol. 2, December 2008, pp. 670-675.

[NgSo08] H.-H. Ng, W.-S. Soh, and M. Motani "MACA-U: A Media Access Protocol for Underwater Acoustic Networks," in *Proceedings of the Global Telecommunications Conference (IEEE GLOBECOM 2008)*, November 2008, pp. 1-5.

[NgSo13] H.-H. Ng, W.-S. Soh, and M. Motani, "A bidirectional-concurrent mac protocol with packet bursting for underwater acoustic networks," *IEEE Journal of Oceanic Engineering*, vol. 38, no. 3, pp. 547-565, July 2013.

[NoLe14] Y. Noh, U. Lee, S. Han, P. Wang, D. Torres, J. Kim, and M. Gerla, "Dots: A propagation delay-aware opportunistic mac protocol for mobile underwater networks," *IEEE Transactions on Mobile Computing*, vol. 13, no. 4, pp. 766-782, April 2014.

[PePe08] C. Petrioli, R. Petroccia, and M. Stojanovic, "A comparative performance evaluation of MAC protocols for underwater sensor networks." in *Proceedings of MTS/IEEE OCEANS 2008*, Quebec City, Quebec, Canada, Sep. 15-18, 2008, pp. 1-10.

[PePe13] L. Pescosolido, C. Petrioli, and L. Picari, "A multi-band noise-aware MAC protocol for underwater acoustic sensor networks," in *Proceedings of IEEE WiMOb 2013*, Lyon, France, Oct. 7-9, 2013, pp. 530-537.

[PeSt07] B. Peleato and M. Stojanovic, "Distance aware collision avoidance protocol for ad-hoc underwater acoustic sensor networks." *IEEE Communications Letters*, vol. 11, no. 12, pp. 1025-1027, December 2007.

[SuBa98] R. S. Sutton and A. G. Barto, *Reinforcement Learning: An Introduction*. Cambridge Univ. Press, 1998.

[SyYe07] A. Syed, W. Ye, and J. HeidemanOn, "Understanding spatio-temporal uncertainty in medium access with ALOHA protocols," in *Proceedings of ACM WUWAlet 2007*, Montr'eal, Quebec, Canada, Sep. 14, 2007, pp. 41-48.

[SyYe08] A. Syed, W. Ye, and J. Heidemann, "Comparison and evaluation of the T-Lohi MAC for underwater acoustic sensor networks," *IEEE Journal on Selected Areas in Communications*, vol. 26, no. 9, pp. 1731-1743, December 2008.

[TaWe10] A. S. Tanenbaum and D. Wetherall, *Computer Networks*, 5th ed. Upper Saddle River, N.J.: Prentice Hall PTR, 2010.

[US3569] US 2008/013569 A1 (BOREN GARY W [US]) 17 January 2008 (2008-01-17)

[US7710] U.S. Pat. No. 7,747,710 B1 (OSBURN III DOUGLAS C [US] ET AL) 29 Jun. 2010 (2010-06-29)

[US7829] US 2004/017829 A1 (GRAY ANDREW A [US] ET AL) 29 Jan. 2004 (2004-01-29)

[US5982] US 2015/295982 A1 (KAFLE PADAM LAL [US] ET AL) 15 Oct. 2015 (2015-10-15)

[ZhQi14] W. Zhang, Z. Qin, J. Xin, L. Wang, M. Zhu, L. Sun, and L. Shu, "UPMAC: A localized load-adaptive MAC protocol for underwater acoustic networks," in *Proceedings of the 23rd International Conference on Computer Communications and Networks*, ICCCN 2014, August 2014, pp. 1-8.

The invention claimed is:

1. A device for selecting dynamically and autonomously in time the best solution to be used for the communication and the configuration that meets the user specifications, adapting autonomously and dynamically and in an effective way to the ever different and changeable conditions of the underwater environment, said device being suitable to be installed on the nodes and on the collector node of an underwater sensor network, equipped with one or more communication apparatuses that operate with different protocol stacks, wherein said device comprises:

a data-storage means where the data packets sent by the nodes are collected, said data packets having headers;

a plurality of connectors for the inter-connection of said device with one or more modems;

a processing unit;

a "protocol selector" computer program executed by said processing unit for determining and changing dynamically the network protocol stack as the current operating conditions of the network vary in order to optimize the performance of the application supported in terms of network latency, packet-delivery fraction, energy consumption, and/or a combination thereof, wherein said protocol selector computer program is constituted by the following modules:

a packet monitor module (module A), for analyzing the packets received by the collector node of said network for extracting the information necessary for:
(i) evaluating the performance of the current protocol; and
(ii) identifying possible changes in the conditions of the network;

a performance meter module (module C), for calculating the performance of the protocol currently in use;

a protocol-change manager module (module E), for managing the protocol change in the network, without interrupting operation thereof; and a communication means for managing and enabling operation of said storage means, communication means, and data-processing means, wherein said protocol selector computer program further comprises the following modules:

a data analyser module (module B), for analyzing the data collected for identifying possible changes in the conditions of the network, said changes regard a different traffic in the network, the terms of amount of data per unit time, a variation in the quality of the acoustic channel, or a change in the size of the packets exchanged by the nodes; and an optimizer module (module D), for executing a learning algorithm, to learn which is the optimal protocol stack for each state of the system, using for this purpose the results produced by the said performance meter (module C);

wherein the protocol selector module characterizes the operating state of the system through a triplet of values that summarizes the condition of the network at a given instant and that is defined as network state $s=(\lambda, q_{snr}, p_{size})$, where $q_{snr}$ is the mean signal-to-noise ratio, $\lambda$ is the network load, and $p_{size}$ is the mean packet size; and wherein, in order to carry out the monitoring the state, the headers of the network packets are extended so as to include the information necessary for identification of the state and evaluation of the protocol stack, to each transmitted packet k the node j adding the header field HDPRE=$<p_k^j,t_{tx}^j,t_k^j>$, where $p_k^j$ is a progressive identifier of the packets sent by node k, $t_{tx}^j$ is the total time of transmission of the node j in the current round, and $t_k^j$ is the timestamp of the packet.

2. A method for enabling an underwater sensor network equipped with one or more communication apparatuses that operate with different protocol stacks, to select dynamically and autonomously in time the best solution to be used for the communication and the configuration that meets the user specifications, adapting autonomously and dynamically and in an effective way to the ever different and changeable conditions of the underwater environment, said method being characterized in that it comprises the steps of:

estimating and learning the state of the system, using the data traffic of the deployed system itself, with co-ordination of a node, selected as collector, the task of which is, in addition to its normal data-collection role, that of determining and changing dynamically the stack of network protocols used in order to optimize the performance features of interest,
where for this purpose said collector node, with a processing unit of its own, implements a "protocol selector" computer program, which comprises the following steps:

a) analysis of the packets received for extracting all the information necessary for:
i) evaluating the performance of the current protocol in use, and
ii) identifying possible changes in the system;

b) analysis of the data collected for identifying possible changes in the network, said changes possibly regarding a different traffic in the network, a variation in the quality of the acoustic channel, or else a change in the size of the packets exchanged by the nodes;

c) calculation of the performance of the protocol stack currently in use;

d) execution of a learning algorithm, for learning which is the protocol stack (steps 1 and 2) optimal for each state of the system, using for this purpose the results produced by step a); and e) management of the change of the protocol stack in the network, without interrupting operation thereof;

wherein in step a) the protocol selector characterizes the operating state of the system through a triplet of values that summarizes the condition of the network at a given instant and that is defined as network state $s=(\lambda, q_{snr}, p_{size})$, where $q_{snr}$ is the mean signal-to-noise ratio, $\lambda$ is the network load, and $p_{size}$ is the mean packet size;

wherein the headers of the network packets are extended so as to include the information necessary for identification of the state and evaluation of the protocol stack, to each transmitted packet k the node i adding the header field HDPRE=$<p_k^j, t_{tx}^j, t_k^j>$, where $p_k^j$ is a progressive identifier of the packets sent by node k, $t_{tx}^j$ is the total time of transmission of the node j in the current round, and $t_k^j$ is the timestamp of the packet.

3. The method according to claim 2, characterized in that the data-analysis module in step b), to detect even significant changes in the state of the network, resorts, for each of said three components of the state, mean signal-to-noise ratio, network load, mean packet size, to a change-detection algorithm of an adaptive type belonging to the CUSUM family [Mo08,CaTo12] combined with a low-pass filter (exponentially weighted moving average, EWMA) for monitoring the average of the values.

4. The method according to claim 2, characterized in that, if the protocol selector does not detect changes of the state, collection of the data proceeds up to the possible completion of the current evaluation interval;

if, instead, the state has changed, data collection is interrupted, the new state is detected, and the best protocol stack is chosen for the new conditions; and once change of state is completed, a new interval of collection of statistics regarding the new state is started.

5. The method according to claim 2, characterized in that at the end of an i-th evaluation interval the performance features of the protocol are first analysed in terms of packet-delivery fraction $r_i$, energy consumption $e_i$, and network latency $l_i$ in the interval just concluded, calculating these values starting from the information contained in the field HDPRE of the packets, as follows:

$r_i$ is calculated as the ratio between the number of packets received in the interval just concluded and the total number of packets sent in the same interval, which for each node can be calculated starting from the header HDPRE using the unique progressive identifier of each packet;

$l_i$ is calculated as mean network latency, the sum of the latencies of each packet received, divided by the total number of packets received, wherein the latency of each packet is obtained from the difference between the instant of receipt and the timestamp $t_k^j$); and, finally;

$e_i$ is calculated as the ratio between the total time spent by the nodes in transmission, by the sum of the values $t_{1x}^j$ contained in the header HDPRE and the total number of data bits received;

starting from the indices $r_i$, $l_i$, and $e_i$, a single aggregate scalar index $c_i$ is then calculated as linear combination of the various performance indices, appropriately normalized in the interval [0,1] and weighted according to the requirements of the application, where the normalization takes into account the maximum and minimum value that each index can assume, which may be precalculated via simulations, may be estimated, or may be based upon experience.

6. The method according to claim 2, characterized in that in the learning step the performance statistics of the protocol $p_i$ used in the last interval are updated, for the current state of the system $s=(\lambda, q_{snr}, p_{size})$, by re-calculating the mean value taking into account the aggregate index $c_i$ just calculated;

the mean value of performance of the protocol $p_i$ being calculated by averaging the values of performance of the protocol in the intervals, in which it has been used, possibly assigning a greater weight to the values of performance in the most recent intervals.

7. The method according to claim 2, characterized in that, following upon the learning step, it is evaluated which protocol stack to use in the next interval, interval i+1, with the system in the state s, where the solution proposed is based upon a general mathematical e-greedy reinforcement-learning technique known as n-armed bandit [SuBa98], so that the choice falls on the protocol stack that has guaranteed the best level of performance for the current state.

* * * * *